May 12, 1970  L. E. KILMARX  3,511,295
TIRE VALVE
Filed Feb. 9, 1968  2 Sheets-Sheet 1
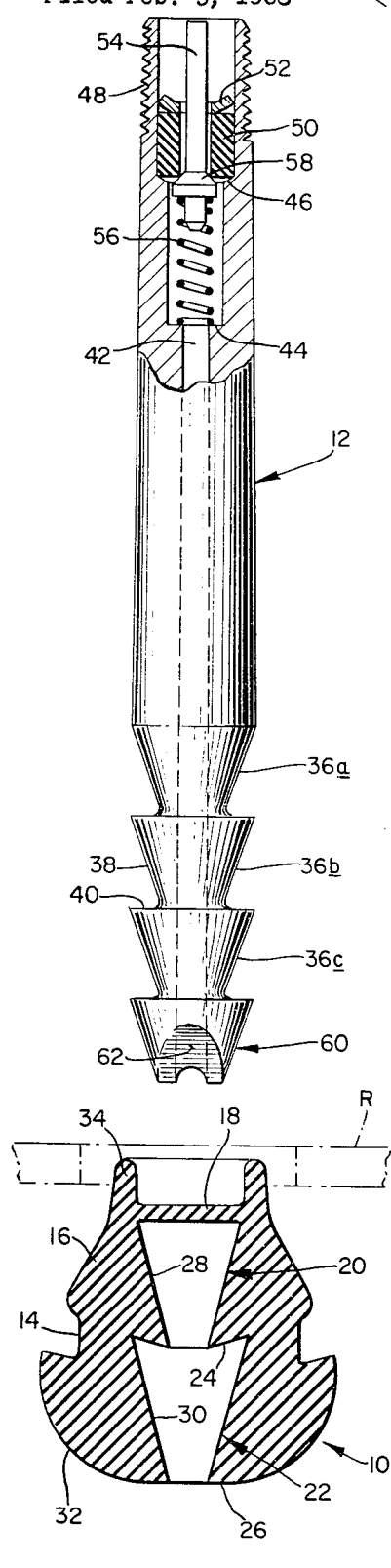
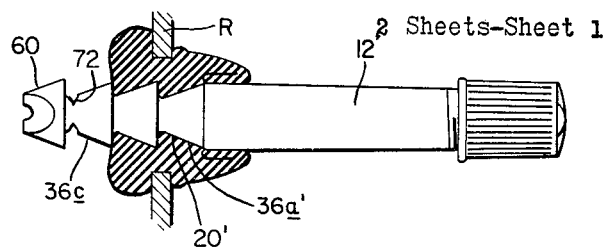
Fig. 2a
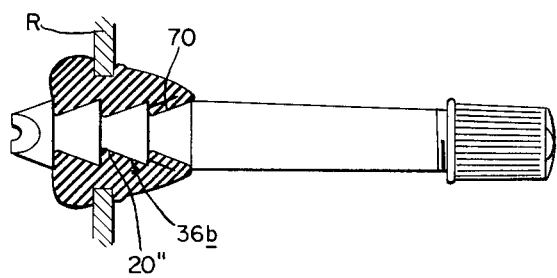
Fig. 2b
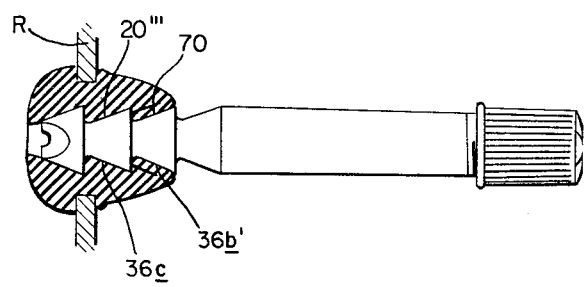
Fig. 2c
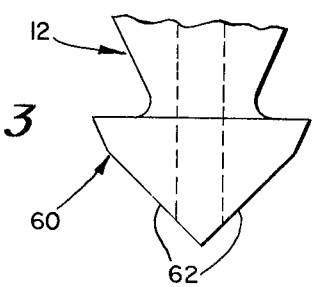
Fig. 3
Fig. 1
INVENTOR.
Louis E. Kilmarx
BY
Dallett Hoopes
ATTORNEY.

May 12, 1970 — L. E. KILMARX — 3,511,295
TIRE VALVE
Filed Feb. 9, 1968 — 2 Sheets-Sheet 2
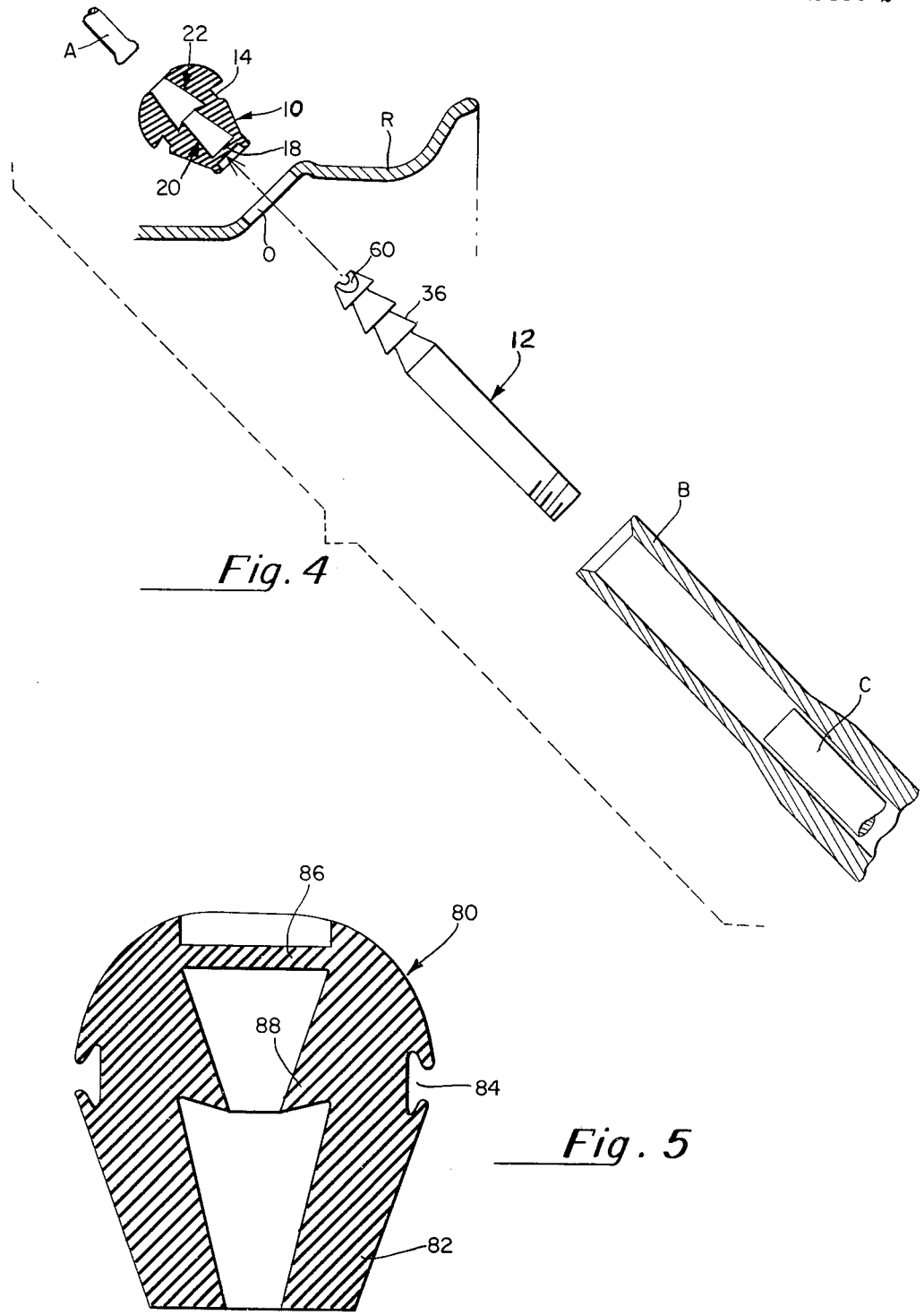
INVENTOR.
Louis E. Kilmarx
BY Dallett Hoopes
ATTORNEY.

United States Patent Office 3,511,295
Patented May 12, 1970

3,511,295
TIRE VALVE
Louis Edward Kilmarx, Dickson, Tenn., assignor to Scovill Manufacturing Company, Waterbury, Conn., a corporation of Connecticut
Filed Feb. 9, 1968, Ser. No. 704,323
Int. Cl. B60c 29/00
U.S. Cl. 152—427          8 Claims

ABSTRACT OF THE DISCLOSURE

A tire valve for tubeless pneumatic tire comprises a plug of rubber or the like mounted in the rim hole opening, and a rigid valve stem having plug engaging means and adapted to be adjustably fixed in the plug to extend out for the desired stem length. This arrangement makes it unnecessary to inventory snap-in valves of a variety of lengths.

---

This invention relates to a tire valve. More specifically, this invention relates to a tire valve comprising a rim hole plug, made of rubber or the like, and a valve stem which may extend into the rim hole plug to protrude from the hole a selected distance, depending on the presence or absence of wheel covers and other factors which dictate the length requirements of the stem.

In a co-pending patent application, Ser. No. 669,225 filed Sept. 20, 1967, I have disclosed a tire valve system in which the valve comprises two parts; a rim hole obstruction element and a valve stem. In accordance with the disclosure of the earlier application, the tire may be filled under the bead with the obstruction element in the rim hole. Subsequently, for instance at the dealer's garage, the automobile purchaser may select the desired valve stem or extension with which he wants his car outfitted. Then, the selected stem is mounted in the rim hole, piercing or pushing to one side all or just a portion of the obstruction element.

The invention of the aforementioned patent application is a marked advance in that it has given the automobile purchaser the opportunity to select the valves with which his car is to be outfitted. It has also made possible the reduced cost of the car to the automobile manufacturer. However, while the earlier invention was a marked advance, it did require the stocking by the automobile dealer of a variety of different lengths of valve stems in each style, a requirement which has increased the inventory problem of the dealer.

It is an object of the present invention to reduce the number of valve stems which need be stocked by the dealer, and also to provide a tire valve arrangement which includes a valve assembly providing a stem of the desired length depending on how the components are assembled.

Other objects of the invention will be apparent from a review of the following specifications including the drawings, wherein:

FIG. 1 is an exploded front view partly in section showing the rim hole plug and valve stem components embodying the invention prior to assembly;

FIGS. 2a, 2b and 2c are reduced front elevations of the assembly showing the stem inserted in the rim hole plug to varying extents to thereby cause the desired amount of protrusion of the stem;

FIG. 3 is an enlarged side view of the plug engaging end of the valve stem;

FIG. 4 is an exploded view showing a rim hole plug and stem, in accordance with the invention, about to be assembled into a tire rim and showing also the tools which are suitable for use in the assembly; and FIG. 5 shows a greatly enlarged modified version of the rim hole plug adapted to be inserted from the outside of the tire rim without disturbing the tire.

Referring more specifically to the drawings, FIG. 1 shows a rim hole plug or "obstruction element" 10 and a valve stem or extension 12. In the version of FIG. 1, the plug 10 is to be inserted from inside the tire out through the hole in the tire rim R. This will normally be done on the rim on the automobile manufacturer's premises.

To grip the rim, the body portion of the plug 10 is provided with a peripheral groove 14. The groove is defined by shoulders which in installation engage the surfaces of the metal rim about the rim opening. The upper portion 16 of the rim hole plug is tapered down to make easier the insertion of the plug into the rim hole.

As shown, the central portion of the plug is hollow except for a thin wall, or diaphagm or membrane 18. The lower central portion is provided with annular inward teeth or flanges 20, 22 which are sharply stepped on their underside as at 24 and 26, but which slope gradually inward on their upperside as at 28 and 30. This gives a sawtooth configuration to the flange profile.

The plug, which may be of rubber or the like, and may be reinforced by a metal or plastic insert, molded or cemented into the rubber if desired or necessary, is formed with a bulbous base 32 and an upwardly extending lip 34. The underside 26 of flange 22 is flush with the bottom of the base in the version shown.

The valve stem or extension component of the assembly, indicated at 12 (FIG. 1), may be of rigid plastic or metal and is distinctive in that at its lower end it is provided with a plurality of annular indentations 36a, 36b, or 36c, which complement generally the shape of the flanges 20, 22 in the rubber hole plug. That is, the upper wall 38 of each indentation slopes inward gradually while the bottom wall 40 is abrupt. It should be understood that the stem shown which embodies the invention is formed with outer surfaces which are surfaces of revolution of a line about the axis of the stem.

As shown, the stem is centrally bored as at 42, the bore being enlarged twice adjacent its upper end to define two annular upwardly facing shoulders 44 and 46. The latter shoulder may slope downward somewhat, as shown.

The upper end of the stem 12 may be threaded exteriorly as at 48 to provide a conventional fill nipple with cap retaining means. A check valve is provided including an annular seat of rubber or the like 50 held in place between shoulder 46 and a metal securing washer 52. Completing the built-in valve assembly is the pin 54, a valve spring 56 which presses the pin 54 upward so that its enlarged tapered flange 58 seats on the underside of the rubber seat 50. The upper end of the pin 54 may be actuated manually or by a servicing tool when deflating or gauging.

It should be understood that the built-in check valve can be replaced by a conventional screw-in tire valve core. In such case, the outer end of passage 40 is shaped to conform with the conventional tire valve core drilling.

The lower end 60 of the stem 12 is sharpened to facilitate the puncture of the obstruction element comprising the membrane or diaphragm 18. This sharpening is effected in the version shown simply by milling off or even molding an angular surface 62 on the opposite sides of the lower end (FIG. 3).

FIGS. 2a, 2b, and 2c, as described, show the stem intruding into the rubber plug to varying degrees. In FIG. 2a, for instance, the stem 12′ extends in with its last indentation 36a′ engaging the opposite surfaces of the upper tooth 20′.

In FIG. 2b, the next to the last indentation 36b′ engages the tooth 20″ and the first indentation 36a′ engages the remnants of the wall or diaphragm 18 which has taken the form of an annular inwardly extending flap designated 70. The latter engagement alone may hold the stem in some versions.

In the FIG. 2c version, the next to the last indentation 36b' engages the annular flap 70 to cause the stem to stick further out from the tire. Indentation 36c engages tooth 20'''.

From FIGS. 2a, 2b and 2c, it will be seen that one of the objects of the invention is satisfied; namely, that the single form of valve stem embodying the invention protrudes to an adjustable extent. It should also be seen that the engagement of the indentations on the stem with the teeth and the wall 18 remnant securely holds the stem against axial outward movement irrespective of the extent of protrusion of the stem. The sawtooth character of the indentations and teeth permit easy insertion of the stem, however.

If desired or necessary, the portions of the stem otherwise inside the tire and not performing a useful function as the end 60 in FIG. 2a may be snapped or cut off and the remaining end sharpened if necessary prior to assembly. To facilitate this special snap-off, grooves may be made in the indentations 36 as at 72 (FIG. 2a) to pre-weaken the stem at appropriate break-off points.

In FIG. 4, the method of assembly of a valve embodying the invention is diagrammed. The wheel rim plug 10 is shown on the inside of the rim, that is, in a position which would be inside the tire were the tire mounted. It is disposed in alignment with the valve opening O of the rim R and with the tapered end 60 pointed towards the opening.

Positioned to the left of the plug as shown in FIG. 4 is the plug inserting tool A. In operation, the tool A is projected into the opening in the base of the rim hole plug and the end of the tool bottoms out on the wall 18 inside the plug. Proceeding further, the tool A drives the plug into the opening O of the rim R so that the shoulders on either side of the groove 14 butt against the opposite faces of the rim about the opening O. Alternatively, a vacuum device may "suck" the plug into the opening from the outside.

Subsequently, perhaps even months later at the dealer's, the stem 12 is installed. The stem 12 is disposed on the opposite side of the rim as shown with the sharpened end 60 adjacent to the rim hole plug 10. The stem insert tool B which is a tubular affair is brought over the stem 12 until the threaded end of the stem bottoms against the preset stop element C. Finally, the stem insert tool B drives the sharpened end 60 of the stem 12 into the plug 10 until the mouth of the tool B butts up against the rim R about the plug. Because the distance between the mouth of the tool B and the stop C has been preset, the stem 12 will stick out to the desired extent and the appropriate indentation 36 will engage the appropriate flange 20, 22 of the plug 10.

In FIG. 5, a modified hole plug 80 is shown which is such that it can be inserted from the outside of the rim. Thus, it can be used as a replacement for instance, being installed without disturbing the tire mounted on the wheel. This plug fits with its tapered end 82 first into the rim opening O with the groove 84 about the plug receiving the metal rim and the wall 86 directed to the outside of the wheel. As can be visualized, a stem, comparable to stem 12 of the earlier versions, pierces the wall 86 from the outside and the appropriate relation inside the plug. A stepped portion of the plug 80 is identified by the numeral 88.

In the original equipment use, the plug 80 may be "sucked" into the opening O of the rim R by a suction device disposed on the inside of the opening. The tire may then be inflated under the bead. Subsequently, perhaps at the dealer's, the stem is inserted in the plug by piercing wall 86.

It should be understood that it is within the scope of the invention to apply the stem to the plug in a single assembly operation at approximately the same time, even simultaneously. In some versions, perhaps the two components of the assembly, that is the plug and the stem, may be appropriately assembled in the desired relationship prior to the installation of the assembly into the rim wheel. However, as has been indicated earlier, it is a preferred version of operation that the plug be installed in the wheel, the tire mounted and filled under the bead and then, perhaps months later, the stem installed in the plug on the dealer's premises. By this way of operation, selection of the color and style of the stems can be left to the last minute to be made by the purchaser of the automobile.

Thus, it will be clear that while there has been only a limited number of versions of the invention shown, the invention is not so limited but is susceptible of many variations and modifications.

I claim:

1. A valve assembly for a pneumatic tubeless tire comprising a plug element adapted to fit into a rim hole, the plug element being centrally hollow except for a puncturable transverse wall, the hollow portion having a stem engaging surface; and a tubular valve stem element having puncture means on its inner end, a plug-engaging longitudinal surface, and a fill nipple on its outer end, one of said elements having on its engaging surface an annular indentation means, and the other element having an annular flange means, at least one of said flange means, and said indentation means being plural and spaced longitudinally of the element, the stem element being received in the hollow portion and a selected one of the plural flanges or indentations cooperating with the other indentation means or flange means to hold the two elements against axial movement, whereby the length of the stem element which protrudes out of the plug, when the assembly is installed in the rim hole, is selectively fixed.

2. An assembly as described in claim 1 wherein the wall after puncture forms an annular flap which engages an indentation on the stem element to enhance the holding thereof.

3. An assembly as described in claim 1 wherein the shapes of the indentations and the flanges are sawtoothed in cross-sectional planes containing the axes of the plug and stem elements, complementing each other to facilitate insertion of the stem element but resisting axially outward movement thereof.

4. An assembly as described in claim 1 where one end of the plug element is tapered to facilitate insertion into such rim hole.

5. A tire valve assembly comprising a rim hole plug of rubber or the like having an axially extending central cavity closed by a transverse puncturable wall and a rigid valve stem having an end adapted to puncture the wall and having a series of longitudinally spaced indentations adapted to selectively engage with the remnants of said puncturable wall to hold the stem in the plug against outward axial movement.

6. An assembly as described in claim 5 wherein the stem has preweakened means to facilitate break-off of unneeded portions.

7. A tire valve assembly comprising a rim hole plug of rubber or the like having an axially extending central cavity closed by a transverse puncturable wall having at least one yieldable inward flange in the opening and spaced from the wall, and a rigid valve stem having an end adapted to puncture the wall and having a series of longitudinally spaced indentations adapted to selectively engage with said inward flange to hold the stem in the plug against outward axial movement.

8. An assembly as described in claim 7 wherein the stem has preweakened means to facilitate break-off of unneeded portions.

References Cited

UNITED STATES PATENTS

| | | | |
|---|---|---|---|
| 2,261,833 | 11/1941 | Kreyer | 152—429 |
| 2,938,561 | 5/1960 | Steer | 152—427 |
| 2,966,191 | 12/1960 | Williams | 152—427 |
| 3,032,091 | 5/1962 | McCord | 152—427 |

JOSEPH R. LECLAIR, Primary Examiner

J. R. GARRETT, Assistant Examiner